United States Patent [19]

Kusuda et al.

[11] 4,156,459
[45] May 29, 1979

[54] PLATE TYPE EVAPORATOR

[75] Inventors: Hisao Kusuda, Tosu; Haruo Uehara, Saga, both of Japan

[73] Assignee: Hisaka Works Ltd., Osaka, Japan

[21] Appl. No.: 797,774

[22] Filed: May 17, 1977

[30] Foreign Application Priority Data

May 17, 1976 [JP] Japan .................................. 51/56863

[51] Int. Cl.$^2$ ............................ F28F 3/00; B01D 1/00
[52] U.S. Cl. .................................. 165/167; 159/28 P; 159/13 B
[58] Field of Search ............ 165/167; 159/28 P, 13 R, 159/13 A, 13 C, 13 B

[56] References Cited

U.S. PATENT DOCUMENTS

| 3,150,028 | 9/1964 | Wennerberg | 158/28 P |
| 3,735,793 | 5/1973 | Burberry et al. | 159/28 P |
| 3,984,281 | 10/1976 | Buchwald | 165/167 |

*Primary Examiner*—Samuel Scott
*Assistant Examiner*—Theophil W. Streule, Jr.
*Attorney, Agent, or Firm*—Armstrong, Nikaido, Marmelstein & Kubovcik

[57] ABSTRACT

An evaporator comprises a plurality of plate assemblies, each consisting of four plates put together with a predetermined distance defined between adjacent plates. In each plate assembly, between the two opposed inner plates, a space into which a liquid to be evaporated is introduced is defined by gaskets extending between and around the outer peripheries of the inner plates. Further, the inner plates and the two outer plates disposed outside the inner plates cooperate with gaskets extending between and around the outer peripheries of the plates to define two evaporating spaces therebetween which are disposed on opposite sides of the central liquid introducing space. The inner plates are each formed with a number of apertures establishing communication between the introducing space and evaporating spaces. Further, the outer plates in each plate assembly cooperate with the outer plates in adjacent plate assemblies to define heat transmitting spaces into which a heating medium is introduced.

6 Claims, 7 Drawing Figures

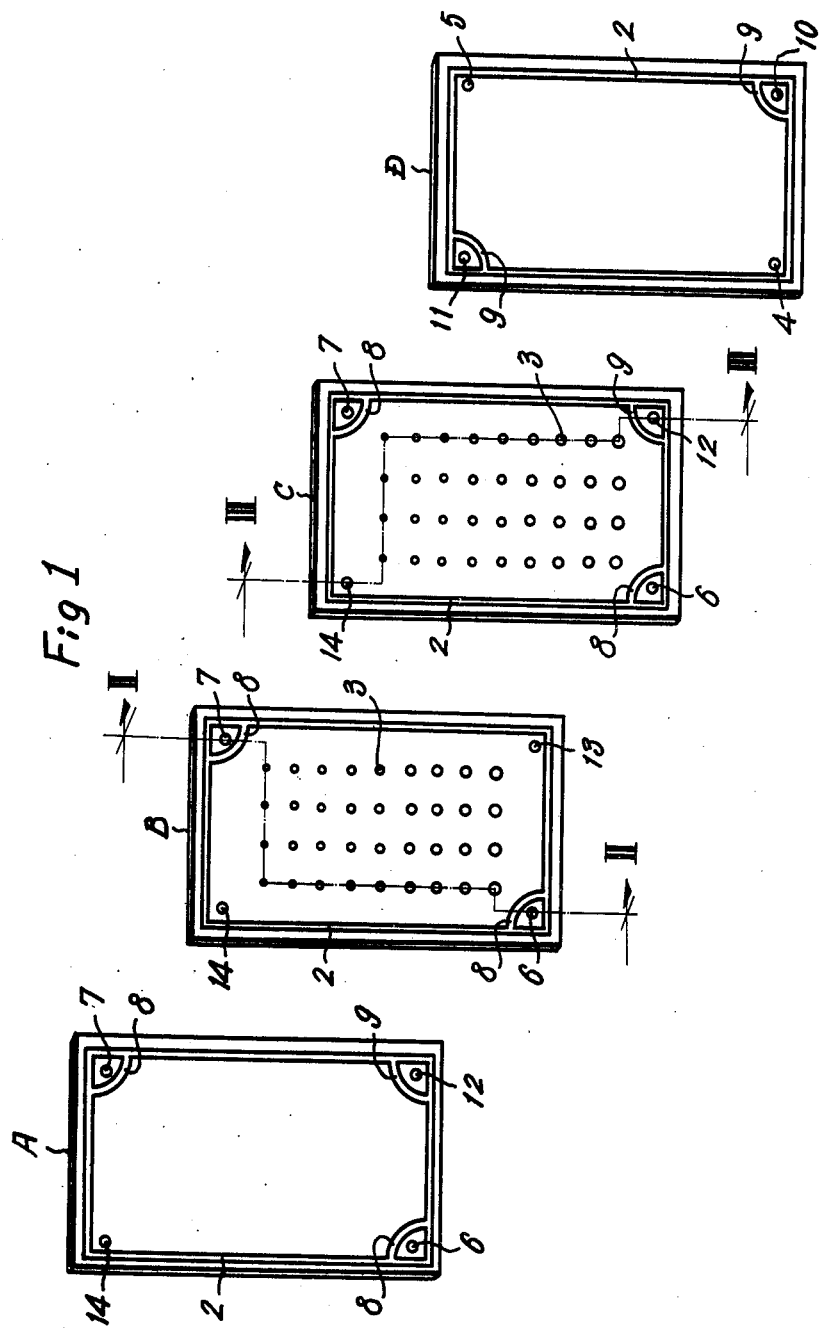

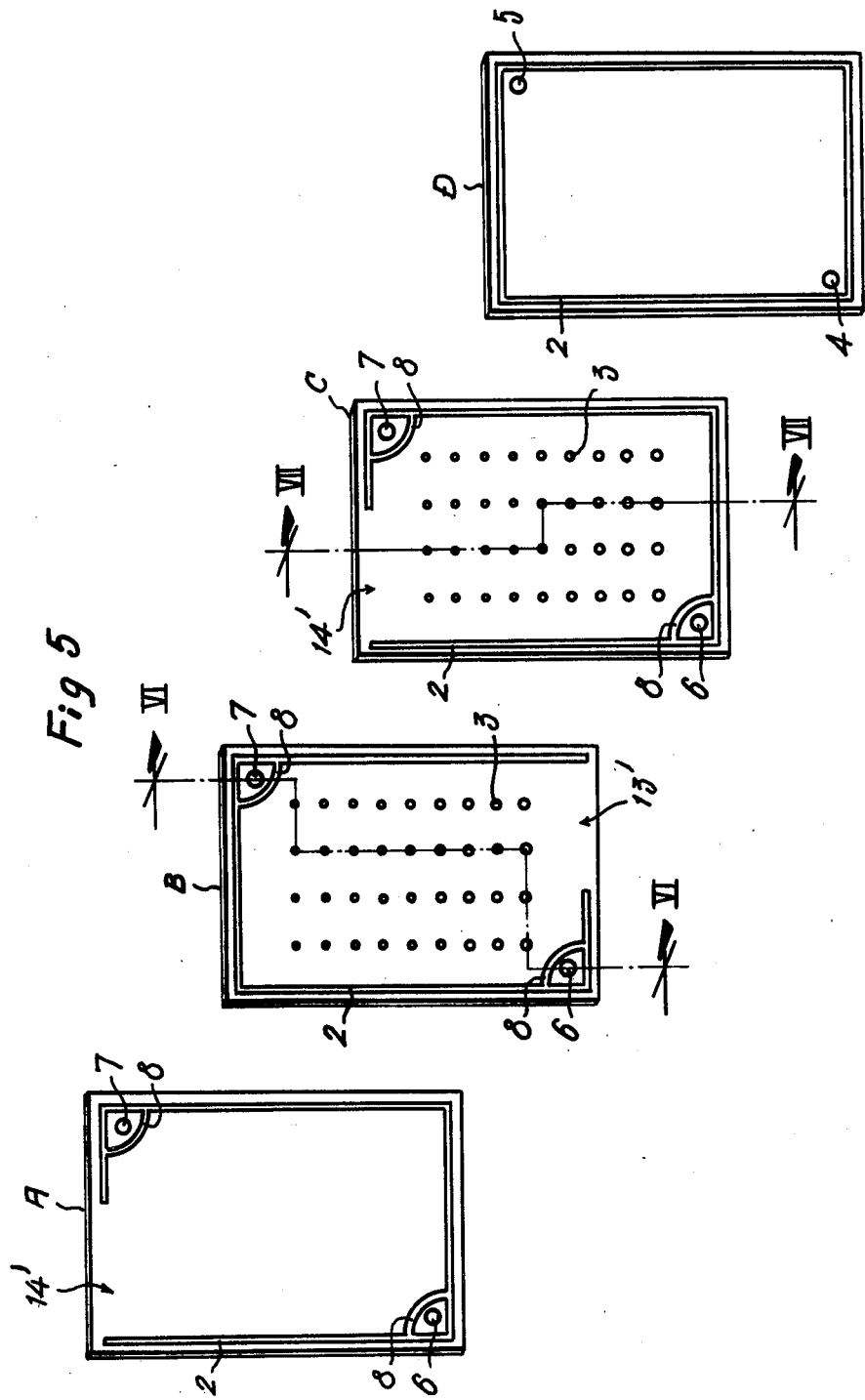

PLATE TYPE EVAPORATOR

BACKGROUND OF THE INVENTION

1. Field of the Invention

The present invention relates to a plate type evaporator wherein a liquid to be evaporated is evaporated by a heating medium.

2. Description of the Prior Art

In an electric generating plant for generating power by circulating a working medium such as water or an organic material, a chemical plant for refining materials, a refrigerating machine and other equipment, an evaporator is used without exception. In many cases, the heat transmitting section of an evaporator used in such plant is in the form of a system of round pipes having smooth inner and outer surfaces or a system of horizontally or vertically disposed round finned-pipes with the fins attached to the outer side of the pipes for improving the rate of heat exchange.

However, in an evaporator having a system of round pipes as described above, it is extremely difficult to improve its performance for the following reasons.

(a). In cases where said round pipes are horizontally or vertically disposed and a heating medium is passed outside the pipes while a liquid to be evaporated is passed inside the pipes for heat exchange, the pipes have to be more densely arranged in order to lower the cost. As a result, the pressure loss of the heating medium is increased and the power required is also increased. Further, since the liquid to be evaporated is passed inside the pipes, unstability of flow due to the so-called two-phase flow phenomenon is caused and depending upon the amount of the liquid to be evaporated there will be a part which does not at all contribute to heat transmission.

(b). In cases where a heating medium is passed inside the pipes while a liquid to be evaporated is passed outside the pipes for heat exchange, about half of the external area of the pipes does not contribute to heat transmission.

(c). In addition to the disadvantages described above, such pipe type evaporator requires much time and labor in drilling end plates for attaching the heat transmitting pipes and assembling the entire evaporator. Moreover, the heat transmitting pipes themselves are very expensive.

Further, in some chemical plants, a plate type evaporator which can be readily fabricated is used. However, in a known plate type evaporator, sets of plates each consisting of two are put together so that a heating medium and a liquid to be evaporated flow alternately and since the liquid is supplied in one direction it is difficult to supply it uniformly over the wide and long heat transmitting surfaces. As a result, scale scorches and sticks to the surfaces of the plates on the evaporating side, greatly lowering the heat transmission effect and decreasing the available running time. Reversely, if a liquid to be evaporated is supplied over the entire heat transmitting surfaces, the thickness of the liquid film gradually increases in a longitudinal direction, greatly decreasing the heat transmission effect.

SUMMARY OF THE INVENTION

The principal object of the present invention is to provide a novel evaporator capable of eliminating the above-described disadvantages of the conventional evaporator.

According to a feature of the invention, an evaporator comprises a plurality of plate assemblies each consisting of four plates put together.

In each plate assembly, between the two inner plates opposed to each other on the inner side, a space into which a liquid to be evaporated is introduced is defined by a gasket extending between and along the outer peripheries of these plates.

The inner plates and the two outer plates disposed outside the inner plates cooperate with gaskets extending between and around the outer peripheries of the plates to define two evaporating spaces therebetween which are disposed on opposite sides of the central liquid introducing space.

Further, on opposite sides of and outside the evaporating spaces, between the outer plates of each plate assembly and the outer plates of adjacent plate assemblies there are heating spaces for a heating medium defined by gaskets extending between and along the outer peripheries of the plates.

The inner plates are each formed with a number of apertures establishing communication between the introducing space and evaporating spaces.

Numerous novel points and special qualities which are characteristic of the present invention will be fully described with reference to the accompanying drawings illustrating embodiments thereof.

BRIEF DESCRIPTION OF THE DRAWINGS

FIG. 1 is a perspective view of plates constituting a plate assembly, illustrating an embodiment of the present invention;

FIG. 5 is a perspective view of plates constituting a plate assembly, illustrating another embodiment of the invention.

DESCRIPTION OF THE PREFERRED EMBODIMENTS

Figure 3:
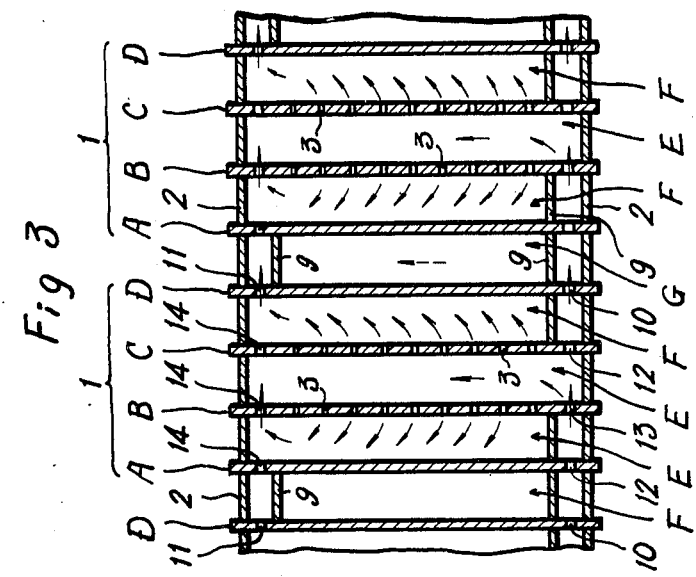
FIGS. 2 and 3 are sectional views taken along the lines II—II and III—III in FIG. 1, respectively, showing the plates in their assembled condition.
Figure 2:
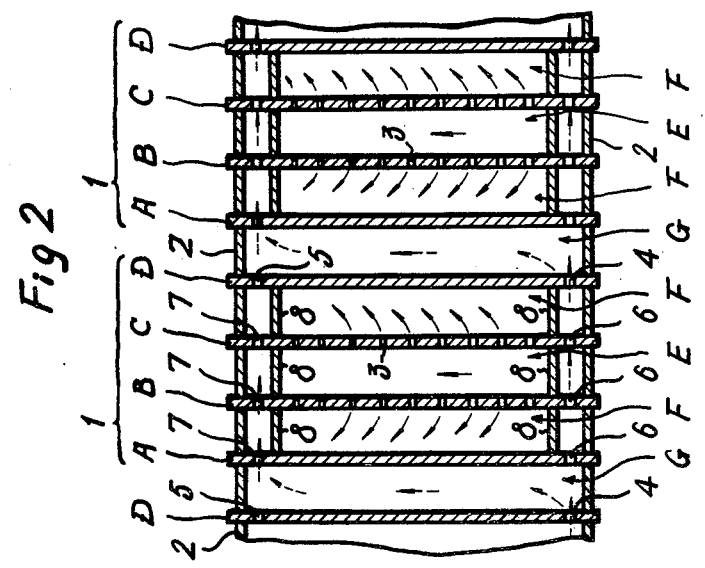

In FIG. 1, four plates constituting a plate assembly are designated at the reference charaters A, B, C and D. An evaporator itself, as shown in FIGS. 2 and 3, is constituted by putting together a plurality of plate assemblies 1 each consisting of four plates. FIGS. 2 and 3 show different sections in order to clarify the paths of flow of a heating medium and a liquid to be evaporated.

The four plates A, B, C and D and D constituting the plate assembly 1 each have a gasket 2 extending around the outer periphery of the plate surface so that when the plates are put together, the required spaces may be defined between adjacent plates. Thus, between the two inner plates B and C opposed to each other inside the plate assembly, an introducing space E for a liquid to be evaporated is defined by the gasket 2. Further, between the inner plates B, C and the outer plates A, D disposed outside said inner plates, evaporating spaces F, F are defined by the gaskets 2, 2. Further, between said outer plates A, D and the outer plates D, A of plate assemblies 1 adjacent thereto, heat transmitting spaces G, G into which a heating medium is fed are defined by the gaskets 2, 2.

Figure 4:
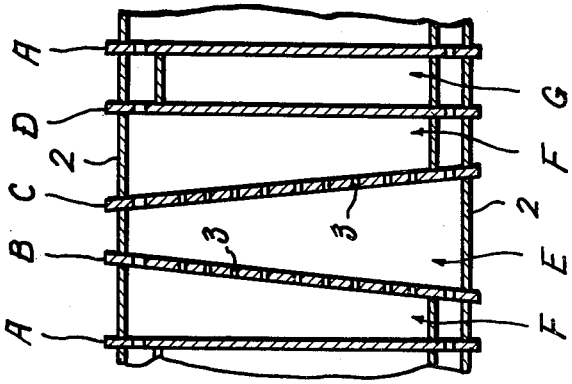
FIG. 4 is a sectional view showing a modification of the plates shown in FIG.3.

The inner plates B and C are each formed with a number of apertures 3 of the required shape distributed over the entire area thereof in the required arrangement, said apertures 3 establishing communication between the liquid introducing space E and the evaporating spaces F, F. Such apertures 3 are large in size on the liquid introducing side, i.e., in a region near the plate bottom and gradually decreased toward the top. In this connection, as shown in FIG. 4, it would be possible to increase the spacing of the introducing space E on the liquid feeding side and gradually decrease it toward the top while maintaining the size of the spouts 3 unchanged.

The introducing space E, evaporating spaces F, F and heat transmitting spaces G, G will now be described with reference to the paths in which a liquid to be evaporated, steam from said liquid and a heating medium flow.

FIGS. 1 through 4 illustrate an embodiment in which holes which define the passageways for the respective fluids are formed in the plates. Thus, the plate D has an inlet 4 and an outlet 5 for a heating medium disposed on a diagonal, i.e., at the lower left corner and the upper right corner and inside the fence 2, as seen in FIG. 1, said inlet and outlet communicating with the heat transmitting space G defined between said plate D and the plate A of an adjacent plate assembly. The plates A, B and C have communication holes 6 and 7 at positions corresponding to the inlet 4 and outlet 5 of the plate D. These communication holes 6 and 7 are separated by the outer gaskets 2 and inner gaskets 8 so as not to communicate with the surfaces of the plates A, B and C.

The plate D is also formed with an inlet 10 for a fluid to be evaporated and an outlet 11 for steam disposed on the other diagonal, i.e., at the lower right corner and the upper left corner and inside the gasket 2, said inlet and outlet being separated from the surface of the plate. At a position corresponding to the inlet 10 of the plate D, the plates A and C have a communication hole 12 similarly separated by the inner gasket 9 and the plate B has an inlet 13 not separated by a gasket. Further, at a position corresponding to the outlet 11 of the plate D, the plates A, B and C each have a communication hole 14 separated by the inner fence.

In operation, a portion of a heating medium is introduced into the heat transmitting space G between the outer plate A of a plate assembly on one side and the outer plate D of an adjacent plate assembly on one side through the heating medium inlet 4 of the outer plate D of said adjacent plate assembly and flows upward while heating the heat transmitting surfaces of the plates A and D and flows out of the communication hole 7 in the upper region of the plate A, as indicated by broken-line arrows in FIG. 2.

Another portion of the heating medium, passing through the communication holes 6 of the plates A, B and C, flows into the heat transmitting space G on the other side of the plate assembly 1 through the heating medium inlet 4 of the outer plate D. Similarly, it flows upward in the heat transmitting space G while heating the plate D and the outer plate A of the other adjacent plate assembly and then in the upper region of the plates it meets the first-mentioned portion of the heating medium which has finished its heat exchange operation and these portions flow together into the communication hole 7 in the plate A of the adjacent plate assembly.

Thus, a heating medium entering the evaporator at one side thereof is distributively fed into the heat transmitting spaces G in the plurality of plate assembies 1 put together, in the manner described above, and portions of the heating medium which have finished their heat exchange operation transversely flow while joining in the upper region of the plates until all the medium is discharged from the other side of the evaporator.

On the other hand, during this, a portion of a liquid to be evaporated passes through the communication hole 10 in the outer plate D of the adjacent plate assembly and the communication hole 12 of the outer plate A and flows into the central introducing space E through the liquid inlet 13 of the plate B and then is passed through the apertures 3 in the plates B and C into the evaporating spaces F, F and clashes against the surfaces of the plates A and D, whereupon it is evaporated on said plate surfaces by heat exchange with said heating medium through plates A and D, the resulting steam flowing out of the steam outlet 11 of the outer plate D of the plate assembly 1.

Thus, in a manner similar to that for said heating medium, such liquid to be evaporated enters the evaporator at one side thereof and is distributively fed into the introducing spaces E of the plate assemblies and in the evaporating spaces F it is evaporated by heat exchange with the heating medium, the resulting streams of steam transversely flow while joining in the upper region of the plates until they are discharged from the other side of the evaporator.

Figure 7:
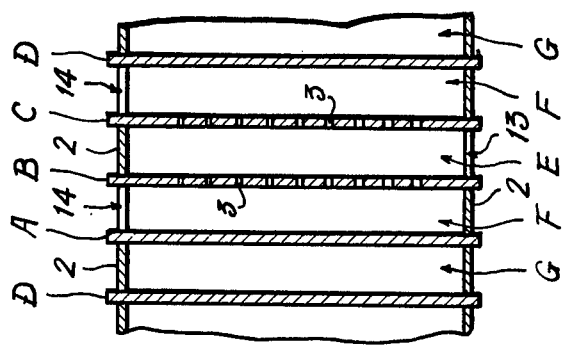
FIGS. 6 and 7 are sectional views taken along the lines VI—VI and VII—VII in FIG. 5, respectively, showing the plates in their assembled condition.
Figure 6:
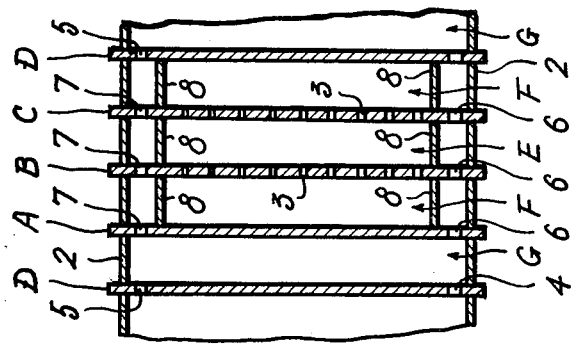

FIGS. 5 through 7 illustrate another embodiment of the invention wherein instead of the liquid inlets 19, 12, 13 and the steam outlets 11, 14 in the embodiment described above, the gaskets 2 are partly cut away to provide inlets 13' and outlets 14' corresponding thereto.

In this case, a liquid to be evaporated is distributively fed into the plate assemblies from below through the inlets 13' and the resulting steam is discharged from the outlets 14', 14' in the upper region. In addition, the path of flow of the heating medium is not different from that defined in the preceding embodiment. In such arrangement, since the liquid inlets 13' and steam outlets 14' can be provided by only partly cutting away the gaskets 2 of the plates A, B and C, there is obtained an advantage that the arrangement is very simple.

As has been described so far, according to the present invention, a liquid to be evaporated is introduced into the central introducing space E in a plate assembly and passes into the evaporating spaces F, F on opposite sides through the apertures 3 formed in the plates B and C defining said introducing space E and clashes against the heat transmitting surfaces of the plates A and D opposed to and disposed outside the plates B and C. Therefore, it follows that a liquid with a high degree of supercooling is fed directly to the plates A and D over their entire surfaces and that the liquid films on the plates A and D are disturbed by air bubbles rising from the lower region of the plates.

Accordingly, there will be no portion whatever in the evaporting spaces F, F that does not contribute to heat transmission, nor will be a possibility of scale scorching and sticking to the upper areas of the plates. Thus, the heat transmission effect is improved several times as compared with the conventional evaporators. Moreover, since the arrangement is very simple, the evaporator can be produced at a very small cost.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. A plate type evaporator comprising a plurality of plate assemblies each plate assembly comprising first, second, third and fourth plate means positioned adjacent to one another; gasket means positioned between each of said plate means and the adjacent plate means; wherein said second and third plate means define an introducing space therebetween for the introduction of a liquid to be evaporated, said first and second plate means and said third and fourth plate means defining evaporating spaces therebetween for evaporating the liquid to be evaporated, said second and third plate means having a plurality of apertures therethrough said apertures being distributed in a pattern over a substantial area of the surface of said second and third plate means for providing an even distribution of the liquid to be evaporated, wherein the liquid to be evaporated flows from said introducing space into said evaporating space through said apertures; and wherein each of said plate assemblies is positioned adjacent to another plate assembly with a gasket means therebetween such that the fourth plate means of one assembly and the first plate means of the adjacent assembly define a heat transmitting space theebetween, wherein a heating medium flows through said heat transmitting space transferring the heat therein through said first and fourth plate means to the liquid to be evaporated in said evaporating space, whereby said liquid is evaporated.

2. A plate type evaporator as set forth in claim 1 wherein said first, second, third and fourth plate means are parallel to one another.

3. A plate type evaporator as set forth in claim 1 wherein said heat transmitting spaces between each of said assemblies are coupled to a common input passage and to a common output passage.

4. A plate type evaporator as set forth in claim 3 wherein said evaporating spaces of all of said assemblies are coupled together by a common output passage.

5. A plate type evaporator as set forth in claim 4 wherein said introducing spaces of all of said assemblies are coupled together by a common input passage.

6. A plate type evaporator as set forth in claim 1 wherein the size of said apertures varies as a function of its position in said pattern.

* * * * *